(12) United States Patent
Henshaw et al.

(10) Patent No.: US 11,818,191 B1
(45) Date of Patent: Nov. 14, 2023

(54) STATELESS LOSSLESS COMPRESSION

(71) Applicant: Two Six Labs, LLC, Arlington, VA (US)

(72) Inventors: Seth Henshaw, Arlington, VA (US); Matthew Blackston, Knoxville, TN (US)

(73) Assignee: Two Six Labs, LLC, Arlington, VA (US)

( * ) Notice: Subject to any disclaimer, the term of this patent is extended or adjusted under 35 U.S.C. 154(b) by 0 days.

(21) Appl. No.: 17/524,263

(22) Filed: Nov. 11, 2021

(51) Int. Cl.
*H04L 65/70* (2022.01)

(52) U.S. Cl.
CPC .................................. *H04L 65/70* (2022.05)

(58) Field of Classification Search
CPC ................................ H04L 65/70; H03M 7/00
See application file for complete search history.

(56) References Cited

U.S. PATENT DOCUMENTS

| | | | | |
|---|---|---|---|---|
| 7,483,581 | B2 | 1/2009 | Raveendran et al. | |
| 9,510,005 | B2* | 11/2016 | Van Der Vleuten | H04N 19/18 |
| 9,819,946 | B2* | 11/2017 | Taubman | H04N 19/60 |
| 11,206,402 | B2* | 12/2021 | Abe | H04N 19/176 |
| 2002/0080873 | A1* | 6/2002 | Yoo | H04L 9/40 |
| | | | | 375/240.01 |
| 2008/0048894 | A1* | 2/2008 | Ridge | H04N 19/13 |
| | | | | 341/67 |
| 2010/0030796 | A1* | 2/2010 | Netz | G06F 16/24561 |
| | | | | 707/756 |
| 2012/0109910 | A1* | 5/2012 | Netz | H03M 7/30 |
| | | | | 707/693 |
| 2014/0321765 | A1* | 10/2014 | Iwamoto | H04N 19/54 |
| | | | | 382/243 |
| 2019/0289325 | A1 | 9/2019 | Chen et al. | |
| 2020/0366899 | A1* | 11/2020 | Fitzgerald | H04N 19/167 |
| 2020/0389646 | A1* | 12/2020 | Abe | H04L 65/403 |
| 2021/0337214 | A1* | 10/2021 | Sullivan | H04N 19/142 |

FOREIGN PATENT DOCUMENTS

| | | | | |
|---|---|---|---|---|
| CN | 102904580 B | * | 10/2015 | |
| CN | 113873252 A | * | 12/2021 | |
| JP | 5770316 B2 | * | 8/2015 | G06F 16/1767 |
| WO | WO-0231673 A1 | * | 4/2002 | H04L 29/06 |
| WO | WO-02061949 A1 | * | 8/2002 | H03M 7/00 |
| WO | WO-2021252593 A1 | * | 12/2021 | H04L 47/12 |

* cited by examiner

*Primary Examiner* — Oanh Duong
(74) *Attorney, Agent, or Firm* — Armis IP Law, LLC

(57) ABSTRACT

An approach for gathering, encoding and transmitting histogram data mitigates the need for transmission resources by compressing the gathered data in a lossless, stateless manner for transmission. A generally sparse data set benefits from an encoding mechanism based on a bit plane arrangement of the raw data. The approach organizes bit planes in a sequential manner, and then encodes values based on intervals of non-zero bit positions. By traversing a sequential string based on the bit plane, each "run" of zeroes tends to produce relatively small values, easing encoding burdens, but also accommodated larger values when necessary. A selective encoding technique invokes different encoding processes based on the magnitude of the interval, to allow use of an encoding that stores each respective value in the fewest bits. Different encoding techniques are applied based on ranges of the interval magnitude, or zero run.

20 Claims, 8 Drawing Sheets

| value | unary | Golomb(M_0=4) | Golomb(M_1=128) | Combined |
|---|---|---|---|---|
| 1 | | 10 | 000 | 00000001 |
| 2 | | 110 | 010 | 00000010 |
| 3 | | 1110 | 011 | 00000011 |
| 4 | | 11110 | 1000 | 00000100 |
| 5 | | 111110 | 1001 | 00000101 |
| 6 | | 1111110 | 1010 | 00000110 |
| 7 | | 11111110 | 1011 | 00000111 |
| 8 | | 111111110 | 11000 | 00001000 |
| 9 | | 1111111110 | 11001 | 00001001 |
| 10 | | 11111111110 | 11010 | 00001010 |
| 11 | | 111111111110 | 11011 | 00001011 |
| 12 | | 1111111111110 | 111000 | 00001100 |
| 13 | | 11111111111110 | 111001 | 00001101 |
| 14 | | 111111111111110 | 111010 | 00001110 |
| 15 | | 1111111111111110 | 111011 | 00001111 |
| 16 | | 11111111111111110 | 1111000 | 00010000 |
| 17 | | 111111111111111110 | 1111001 | 00010001 |
| 18 | | 1111111111111111110 | 1111010 | 00010010 |
| 19 | | 11111111111111111110 | 1111011 | 00010011 |
| 20 | | 111111111111111111110 | 11111000 | 00010100 |
| 21 | | 1111111111111111111110 | 11111001 | 00010101 |
| 22 | | 11111111111111111111110 | 11111010 | 00010110 |
| 23 | | 111111111111111111111110 | 11111011 | 00010111 |
| 24 | | 1111111111111111111111110 | 111111000 | 00011000 |
| 25 | | 11111111111111111111111110 | 111111001 | 00011001 |
| 26 | | 111111111111111111111111110 | 111111010 | 00011010 |
| 27 | | 1111111111111111111111111110 | 111111011 | 00011011 |
| 28 | | 11111111111111111111111111110 | 1111111000 | 00011100 |
| 29 | | 111111111111111111111111111110 | 1111111001 | 00011101 |
| 30 | | 1111111111111111111111111111110 | 1111111010 | 00011110 |
| 31 | | 11111111111111111111111111111110 | 1111111011 | 00011111 |
| 32 | | 111111111111111111111111111111110 | 11111111000 | 00100000 |
| 33 | | 1111111111111111111111111111111110 | 11111111001 | 00100001 |
| 34 | | 11111111111111111111111111111111110 | 11111111010 | 00100010 |
| 35 | | 111111111111111111111111111111111110 | 11111111011 | 00100011 |
| 36 | | 1111111111111111111111111111111111110 | 111111111000 | 00100100 |
| 37 | | 11111111111111111111111111111111111110 | 111111111001 | 00100101 |
| 38 | | 111111111111111111111111111111111111110 | 111111111010 | 00100110 |
| 39 | | 1111111111111111111111111111111111111110 | 111111111011 | 00100111 |
| 40 | | 11111111111111111111111111111111111111110 | 1111111111000 | 001010000000 |
| 41 | | 111111111111111111111111111111111111111110 | 1111111111001 | 001010000001 |
| 42 | | 1111111111111111111111111111111111111111110 | 1111111111010 | 001010000010 |
| 43 | | 11111111111111111111111111111111111111111110 | 1111111111011 | 001010000011 |

FIG. 5

STATELESS LOSSLESS COMPRESSION

STATEMENT REGARDING FEDERALLY SPONSORED RESEARCH AND DEVELOPMENT

This invention was made, at least in part, with government support under Contract No. 70RWMD19C00000005. The Government has certain rights in the invention.

BACKGROUND

Data compression and encoding is often used to reduce the representation of a given volume of data prior to transport or storage. Modern storage and electronic communication mechanisms can support substantial volumes of data gathered from sensors that collect passive observations of environmental, ambient and atmospheric conditions, however these can incur substantial costs. Additionally, with the onset of the so-called "Big Data Revolution", the collection of readily observable data, however sparse, has ushered in a heightened order of magnitude of said data, even if the current utility of the data is not understood. For example, collection and storage of ambient environmental "background" data can often be used in subsequent studies, observations or analyses.

In an example of radiation emission detector beacons, or radiological beacons, ambient discharge of electromagnetic radiation can be indicative of unknown, harmful and/or illicit transport of radioactive materials. In this example, the temporal fidelity of the collected data, required to detect transient materials in the environment, often results in low statistical fidelity of the individual samples, making the data both sparse (meaning that much of the data is zero or null) as well as largely invariant over time. Despite this, it is often the case that all data from such sensors is desired to be transmitted and archived for future processing. Data transmission costs for maintaining a large number of deployed beacons for detecting and gathering radiological gamma-ray spectral data under these conditions can be substantial.

SUMMARY

An approach for encoding (using a relevant compression method) and transmitting spectral data, often in the form of histogram data reduces the amount of data that needs to be transmitted by compressing the gathered data in a lossless, stateless manner. Radiation spectra are found to have a compression benefit from an encoding approach based on a "bit-plane" rearrangement of the raw data since occupied bit locations within this rearrangement are locally clustered due to the statistical nature of the binned data within the histogram. The nth "bit-plane" is defined as an ordered list of all the nth least significant bit values for the array of numbers that define the histogram. The approach interleaves the underlying information about the original bin values by ordering each successive bit-plane in a sequential manner, thereby creating a list of bits which represents the "serialized bit-plane representation". Then, differences in index between set bits (i.e., intervals between set bits) of the bit-plane array are encoded as positive integers. The use of bit index differences, generally, results in a collection of small numbers (generally with many repetitive sequences) along with relatively few large numbers. A selective encoding technique invokes different variable length encoding processes based on the magnitude of the value to encode, allowing the use of an encoding that stores each respective value in as fewest bits as possible. The variable length encoding techniques used are unary and parameterized Golomb encoding, with unary used for small values and Golomb for larger values.

Sampled data is often represented in a histogram form, sometimes also known as a "bar graph." In statistical terms, this means a sequence of "bins" with the value in a bin being representative of a number of counts or some other metric assigned to that respective bin. In many contexts, the bins may have a substantial number of zero or null values for large regions of the histogram, leaving nonzero values clustered in the other regions of the histogram. Histogram data with clustered counts often benefit from the bit plane reordering approach.

Very few purpose-built compression algorithms exist for radiation spectral data, but one recent approach takes a time sequence of spectra and leverages the Poisson nature of the counts in each bin to encode only differences from the expected Poisson mean of each bin. This approach, while powerful employs a stateful approach, meaning that knowledge of all preceding data in a sequence of gathered data is used as input to determine how subsequent data are compressed or decompressed. This stateful property, therefore, requires careful coordination between the transmitter and receiver of data. If connection between transmitter and receiver is unstable, or if data come out of order, the state must be rebuilt, resulting in an adverse effect on compression performance. Accordingly, configurations herein overcome the coordination problem of stateful approaches by providing the stateless and lossless encoding approach summarized above. This stateless approach demonstrates highly efficient compression performance by making a direct transform of the representation of the data, without requiring state to be maintained between transmitter and receiver.

The effectiveness of the disclosed approach hinges on three primary factors. First, the dimensionality of the data to be encoded is reduced by transforming the spectrum into a serialized bit-plane representation as described below. This effectively reduces the spectrum representation that consists of two dimensions, channels and values, down to a single list of indices where bits are set (i.e. 1's). Second, the values in the list of indices are manipulated to be as small as possible to enable efficient encoding. This is achieved by not encoding the index values of the set bits themselves, but rather the differences between adjacent indices of set bits. In addition, prior to transforming into the bit-plane representation, any zero padding at the beginning or end of the spectrum is removed to reduce differences between indices of set bits that cross from one bit-plane to the next higher bit-plane. Third, an efficient scheme for encoding the index differences themselves is used that relies on multiple variable-length encoding techniques optimized for the size of the value to encode. The use of multiple encoding techniques requires special unique bit patterns that serve as flags or escape sequences to indicate the type of encoding being used, allowing the compressed spectra to be decoded following transmission. The disclosed approach receives a list of integer values representing spectral histograms from gathered data, and employs a method for stateless, lossless encoding for transmission to a receiving node. The stream is encoded based on the methods described herein where intervals between set bits of a serialized bit-plane representation of the original list of integers according to a variable-length encoding scheme that selects the optimum encoding approach for the value to be encoded.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5 shows encoding of values based on encoding techniques selected according to FIG. 4;

DETAILED DESCRIPTION

A system for gathering gamma-ray spectra from many sensors over a large geographic region such as a city can alert interested parties to the presence of benign or hazardous materials that emit ionizing radiation. A typical type of sensed radiation from these sensors is that of gamma-rays. Data gathered from these gamma-ray sensors are collected as histogram data and, as such, are typically a list of integer count values; but the approach described here is likely to also be successful with lists of other types of numbers expressed in binary format and in contexts other than the radiological space. Accordingly, the examples herein should be taken as but one approach to improved encoding and transmission of histogram data, however any suitable information set or stream capable of being represented as a series of integers may be amenable to configurations herein.

Figure 1:
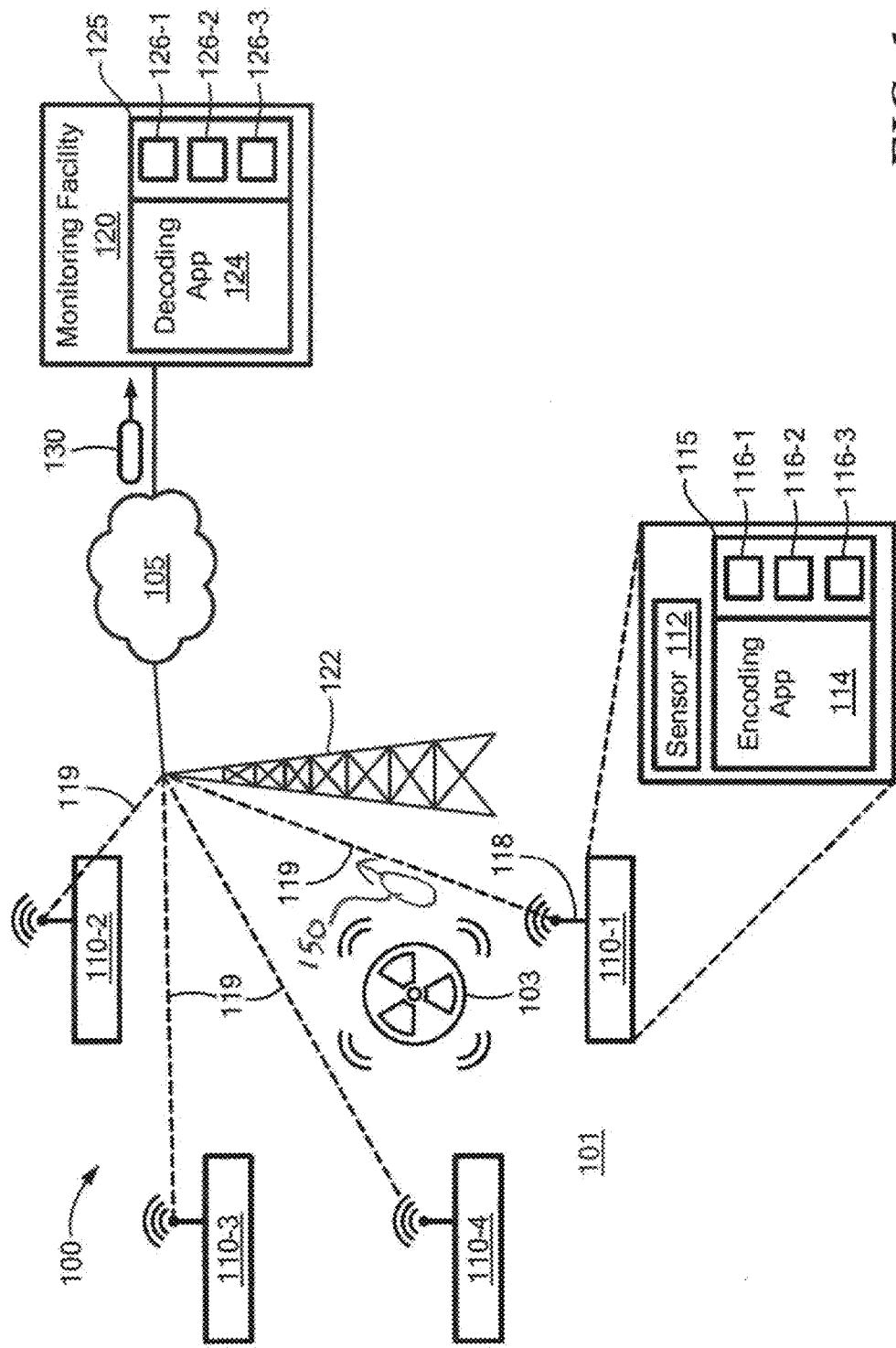
FIG. 1 is a context diagram of a data gathering environment suitable for use with configurations herein.

FIG. 1 is a context diagram of a data gathering environment suitable for use with configurations herein using radiological spectral data gathering techniques. An implementation such as this utilizes a plurality of sensors attached to a means of transmitting data arranged intermittently around an area. It is typically the case that a sensor will collect data for a given interval of time and then transmit that data to a computing node (e.g. the "cloud") that analyzes and stores it, and repeats this process continually to provide a continuous monitoring capability. In the case of radiological data, a substantial volume of data must be transmitted in this way, and it is often the case that conventional cellular data plans accomplish this at significant cost. Compressive encoding (encoding) is therefore desirable for mitigating bandwidth and thus reducing cost.

Referring to FIGS. 1, an example of lossless compression via selective encoding is illustrated for a network 100 of radiological beacons 110-1..110-4 (110 generally). Various other sensing technologies may be employed and transmit their own data. The beacons 110 are disposed around a sensing environment 101 and communicate with a central computer/monitoring facility 120 via a wireless medium such as cellular data via cell tower 122 and a transmission medium such as the Internet 105. Each beacon 110 includes detection sensors 112 and an encoding application 114 (app) with encoding logic 115. The encoding logic 115 includes one or more encoding processors (encoders) 116-1..116-3 (116 generally), selected by the encoding logic for encoding incoming data 150 using a particular technique, as discussed further below. A wireless antenna 118 allows transmission of wireless signals 119 to the cell tower 122 for receipt by the central computer/monitoring facility 120.

The central computer/monitoring facility 120 includes an aggregation and gathering application 124 with decoding logic 125. The decoding logic 125 is complementary to the encoding logic 115 and includes decoding processors (decoders) 126-1..126-3 for decompressing the spectral data 130 transmitted from the beacons 110.

Figure 2:
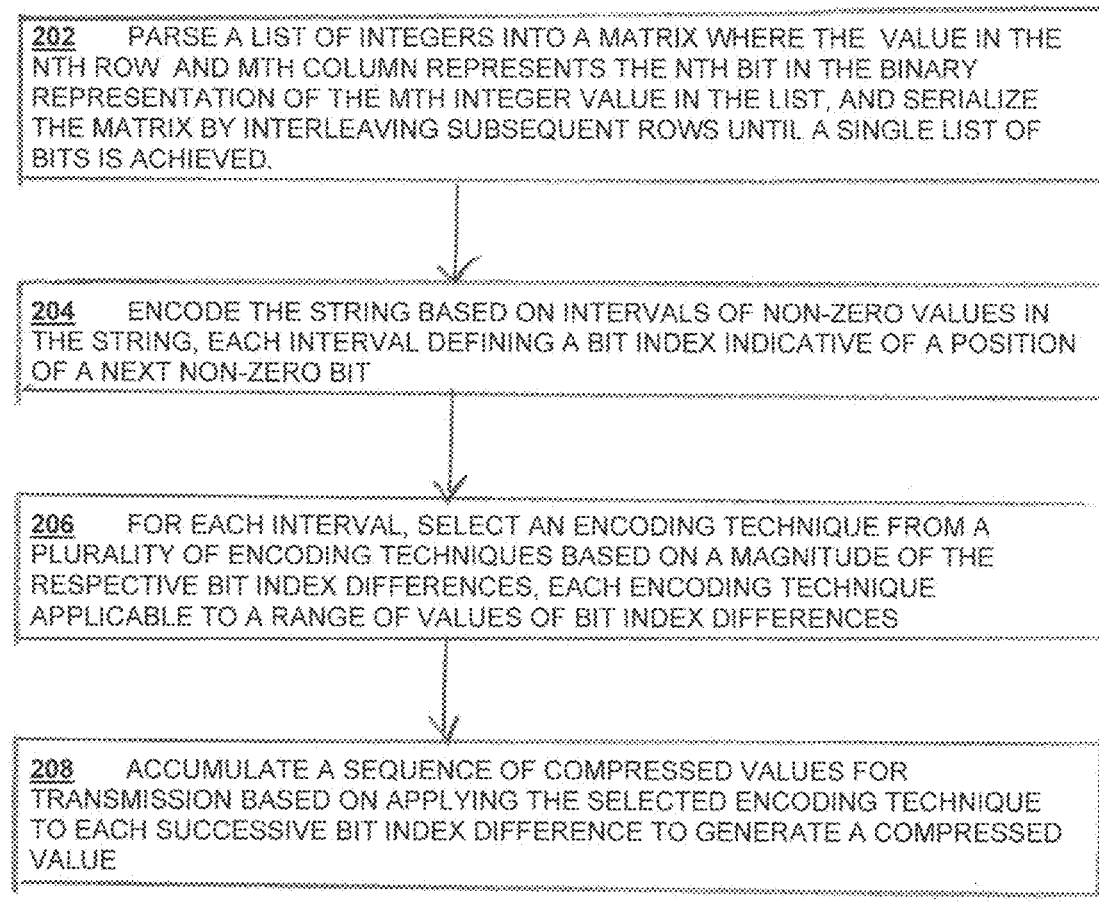
FIG. 2 is a flowchart of encoding a stream of integer values derived from a data gathering environment as in FIG. 1.

FIG. 2 is a flowchart demonstrating the encoding of a stream of integer values derived from a data gathering environment as in FIG. 1. In a general implementation, the method of lossless, stateless encoding of histogram data for transmission includes transforming a standard binary representation of the data to one based on a serialized bit-plane representation of said stream transmission, as depicted at step 202, and encoding the serialized bit-plane (a list of bit values 0 or 1) based on intervals of non-zero values found in the list, as shown at step 204. In the example configuration shown below, the bit plane generation includes parsing a list of integers into a matrix where the value in the Nth row and Mth column represents the Nth bit in the binary representation of the Mth integer value in the list. Further, serialize the matrix by interleaving subsequent rows until a single list of bits is achieved. The interval between set bits defines a bit index difference indicative of a position of a next non-zero bit In the case where adjacent bits are all "occupied", meaning they have a value of 1, the bit index difference values will be 1, however, when there is a long run of "un-occupied" bit locations, the bit index difference will equal the length of said run, typically a large number; in other words the index, or number of bits, to the next nonzero bit. Formation of the bit-plane representation is discussed further below.

The string for encoding is formed by concatenation of the bit index differences as calculated from the serialized bit-plane representation described above. For each bit index difference, the encoding application 114 selects an encoding technique from a plurality of encoding techniques based on a magnitude of the respective bit index difference, meaning a position or offset from the previous non-zero value, as disclosed at step 206. Each encoding technique is therefore applicable to a range of values of bit index differences. By parsing the string, the encoding application 114 accumulates a sequence of compressed values for transmission based on applying the selected encoding technique to each successive bit index difference to generate a compressed value, as depicted at step 208. The accumulation of compressed values requires less space for transmission than the original stream of integers from which they were encoded.

Figures 3, 4:
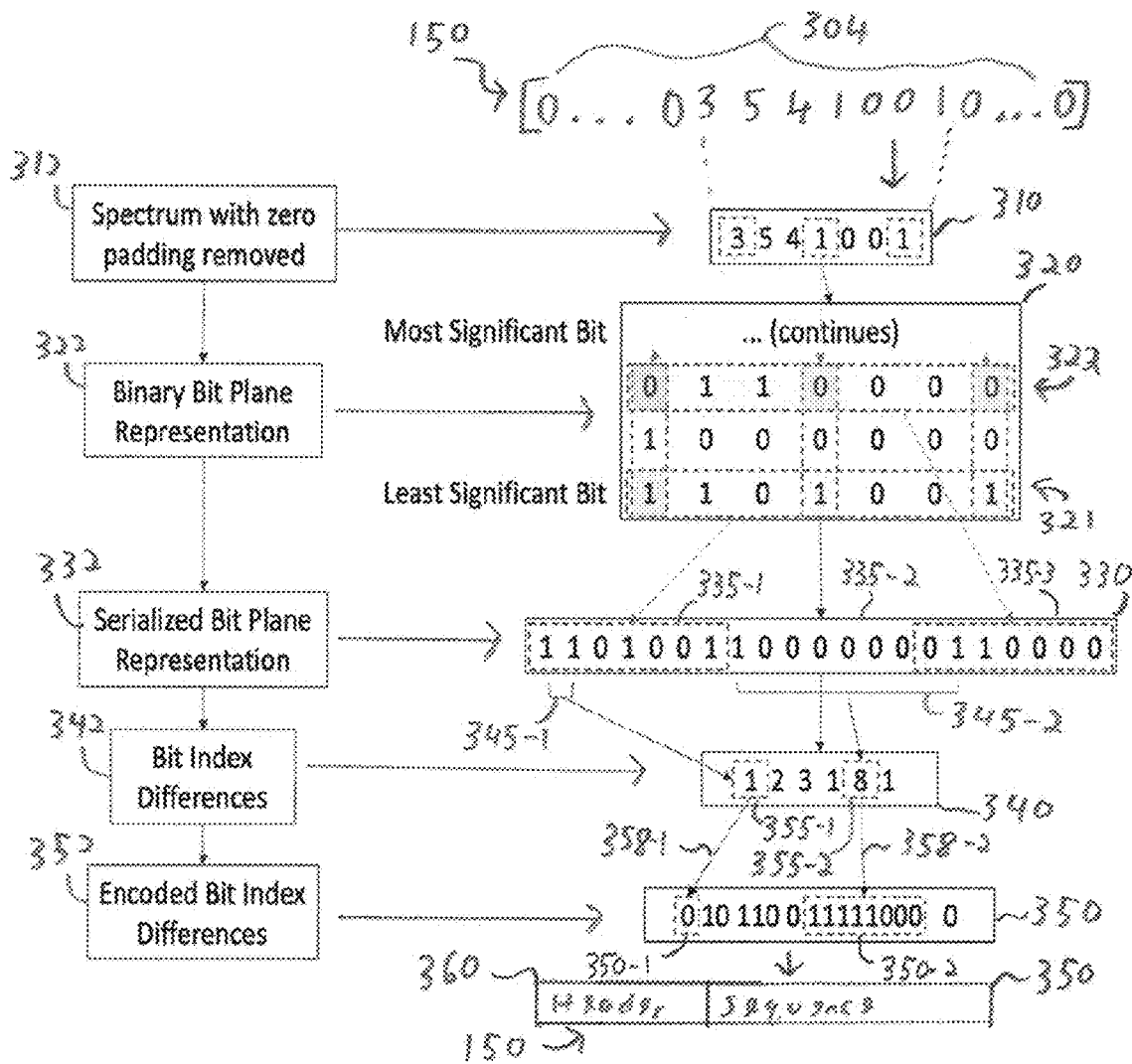
FIG. 3 is a data flow diagram of an encoding approach as in FIG. 2.
FIG. 4 shows encoding techniques selected by the approach in FIGS. 2 and 3.

FIG. 3 is a data flow diagram of an encoding approach as in FIG. 2. Configurations herein are presented in the context of spectra from gamma-ray detectors, a usage distinct from other dedicated compression approaches for gamma ray detection and reporting.

The approach to encoding gamma-ray spectra starts with the spectral histogram data which represents a frequency distribution of registered encounters of gamma-rays with the sensor. The independent variable for the distribution being the relative amplitude of the interaction between the gamma-ray and the sensor which, at a very rough level, is a measure of the energy of the incident gamma-ray. As such, gamma-ray spectra consist of some number of channels or bins, with each bin very roughly characterizing a contiguous energy range of detected gamma rays. After a given amount of measurement time, each bin will have some number of counts that indicates how many gamma rays were detected within each binned range. A spectrum, then, consists of an ordered list of numbers, represented as integers in the present context. The first number is understood to be the counts in channel 0, the second is understood to be the counts in channel 1, and so on. In the streaming context, spectra are produced periodically and each needs to be compressed. The data for a particular time period is therefore a stream of integers representing increasing bin ranges. Any suitable histogram or ordered set of integer values is therefore applicable to the approach discussed below.

Referring to FIGS. 1-3, incoming data 150 takes the form of a series 304 of integers which is first zero-stripped by removing any zero padding at the beginning and end of the series to form a stream 310 of integers. The stream represents the spectrum with zero padding removed 312. Zero padding represents null values, or bins with zero counts at the lower and higher ranges of the spectrum. The stripped zeros are included with a header upon transmission, along with the number of bins/integers to allow reconstruction of the original histogram/bin structure upon decoding.

The encoder 114 stores a binary form of each ordered integer from the stream 310 in consecutive columns positions in a bit-plane representation 320. The rows of this representation representing the bit significance position starting with the least significant bit position 321 to the most significant bit position 322, determined by the largest value in the string 310. For a maximum value of 5, 3 bit planes are needed to accommodate binary representations of values up to 7. The bit-plane representation 320 includes an array of binary digits having dimensions based on the largest run of bin-values that both starts and ends with a nonzero value in the stream 310 (after zero stripping) and a number of binary bits representing a largest value in the stream 310. In actual practice with radiation spectra, the number of bins would be on the order of 1024-4096 (or 2^10 to 2^12) bins, of which high and low null bins would be stripped out. Reduction of the incoming spectrum to a list of bit-plane index differences, as described in the process below, ensures that the number of values to be encoded is relatively small.

A string 330 of binary digits is derived by computing a binary sequence based on a binary representation 322, such as the bit-plane representation 320, of the ordered values for transmission. Bit plane slicing commences with the least significant bit 321 position. Each "slice," depicted as a horizontal row, defines a segment 335-1..335-3 (335 generally) that has a number of bits based on the number of values between a first nonzero value in the stream and a last nonzero value in the stream 310. The encoder 114 concatenates the bit plane segments 335 to form the string 330, commencing with the Least Significant Bit (LSB) slice 321, in a one-dimensional Boolean array to the Most Significant Bit (MSB) slice 322. Other derivations to transform the stream 320 into a serialized bit plane representation 330, or binary string, may be employed, with a view towards maintaining relatively long runs of zeros, as will now be described.

Rather than encoding the binary representation directly, the number of zero bits between each "1" (set) bit are aggregated as bit index differences. A bit index 340 is derived based on the bit "distance" or index 345-1..345-2 (345 generally) between each nonzero value (which must be a 1 for the binary string 330). The bit-index difference array 340 has the difference in bit positions between each non-zero value; two are shown for illustration. Index 345-1 shows a 1 bit shift to the next non-zero position, while index 345-2 shows 8 bit position shift. Each successively indexed bit shift is stored in the bit index difference array 340.

The encoder 114 generates encoded bit index differences by selecting and applying an encoding technique to the magnitude 355-1..355-2 (value) of each bit index difference 345 to form a sequence of compressed values 350. The encoder selects one of several encoding techniques based on the magnitude, where higher magnitudes (355 generally) trigger encoding techniques that are more efficient with larger values, and smaller values are encoded with more efficient techniques, such as unary encoding.

FIG. 4 shows a table 400 of encoding techniques selected by the approach in FIGS. 2 and 3. Encoding technique selection is based the magnitude of each respective bit index difference. In table 400, a plurality of entries 401-1..401-3 (401 generally) includes an available encoding technique. Each available encoding type 402 corresponds to a range of magnitudes to which said technique corresponds. The selected encoding technique 404 defines how that particular magnitude will be encoded. An escape pattern 406 must be added as a prefix to indicate the encoding technique, and usage is discussed further below. A range 408 determines the values for which each encoding technique will be applied. Other suitable encoding techniques could be employed, and differing granularities of range and available techniques may be employed. It is generally significant that the prepended escape pattern 406 be unique from a value that could result from encoding of the actual magnitude values.

The range 408 designates the encoding technique for particular magnitudes given an example set of input algorithm parameters, which are described below. Since the bit index differences cannot be zero (zero index would imply the same bit position), encoding of a 0 value need not be addressed. Small bit index differences ranging from 1-4 receive unary encoding. Entries 401-2 and 401-3 invoke Golomb encoding. Golomb encoding is a parameterized encoding technique that adjusts encoded values based on a degree of compression sought and a range of values expected for encoding. A deterministic mapping of Golomb encoding corresponding to entries 401-2 and 401-3 is shown for a specific set of Golomb parameters and unary threshold in FIG. 5. For the approach herein, two levels of granularity are selected for Golomb encoding. In this example, magnitudes in the range of 4-39 are encoding using small Golomb of entry 401-2 and magnitudes greater than 39 incur large Golomb encoding of entry 401-3.

Golomb encoding receives a tunable parameter; M0 for small Golomb and M1 for large Golomb. In the example of FIGS. 3-5, M0=4 and M1=128.

FIG. 5 shows encoded values based on encoding techniques selected according to FIG. 4. In FIG. 5, a table 500 shows encoding results for the available encoding techniques. A unary result 502 indicates the result of unary encoding for the value 501 defining the entry. A small Golomb (M0=4) result is shown in column 504, and large Golomb (M1=128) in column 506. A combined 508 result gives the resulting encoding magnitude 358-1..358-2 based on which of the three encodings results in the least number of bits in the encoded representation. The combined representation, along with appropriate escape patterns, are used as the sequence of compressed values 350.

The combined 508 result indicates the value written to the sequence of compressed values 350 based on the encoding logic 115 embodied in the table 400. Table 400 also demonstrates other transformations to facilitate performance, including augmenting each magnitude with an offset for shifting the encoding to a lower value. First, since the bit indices cannot be zero, unary encoding actually subtracts 1 from the magnitude prior to encoding, to save additional space. Second, an escape sequence to facilitate decoding is appended in the form of set bits, to indicate small and large Golomb techniques, both shown in the encoding parameters of column 404.

The encoding logic 115 takes three parameters as inputs: a threshold which defines the value under which unary encoding is used and the two Golomb M parameters. These parameters are selectable by the user and optimum values will depend on the application. Because each value to encode must have a unique encoding that allows it to be decoded, special bit patterns (i.e., escape patterns) are employed to indicate which encoding technique is being used for each magnitude. The following scheme is employed. In FIG. 5, Unary(x) (502) indicates unary encoding of the value x, and the unary threshold (i.e., the upper bit index difference that will be encoded in unary form) is represented by T, Golomb(x, Mi) indicates Golomb encoding with Golomb parameter Mi, and "T set bits" indicates T consecutive set bits (e.g. if T=4, "T set bits" is four consecutive 1's: 1111). FIG. 5 shows the encoded results for a given set of encoding parameters, where it is clear that the routine will be most effective when bit index differences are kept small and or when instances of large values are minimized.

In this specific example, magnitudes in the range of 1-4 are encoded with unary encoding. Unary encoding is a direct mapping of integer values to a binary sequence, as shown in column 502. The boundary between when a value is encoded using "Small Golomb" versus "Large Golomb" is determined by which produces the smallest encoded size. In practice this can be precomputed based on a set of input parameters. For magnitudes of 5-39, small Golomb as called for in entry 401-2, and greater magnitudes invoke large Golomb (401-3).

Take the example of the first encoded magnitude 355-1, representing a bit index difference of 1 in the interval 345-1. Since there are no 0 bits in that interval, the bit index shift to the next set bit is 1. By table entry 401-1, this qualifies for Unary encoding, thus encoding the value (x−1), or 0. Encoding result 508-1 shows an encoded value of 0 for the input 501-1 of 1. Therefore, encoded sequence 350 stores an encoded value 350-1 of "0".

Another example is shown by bit index difference 355-2, depicting a run of 7 zero bits and thus an index difference of 8. This value calls for small Golomb encoding by entry 401-2. The value to be encoded is reduced (x-T) by the number of set bits (4), so the value for small Golomb encoding is 4. Referring to entry 501-4, for small Golomb encoding 504 gives an encoded value of "1000" at entry 550. The combined (encoded) value in col. 508 appends the set bits "1111" as a prefix to form "11111000" as entry 508-8. Recall that columns 502, 504 and 506 are predetermined encoding schemes based on the example algorithm parameters, while the result of col. 508 incorporates the encoding logic of table 400.

It should be noted that the number of set bits (4) correspond to the unary threshold (T), where values up to T=4 will be encoded as (x−1), hence 4−1=3 yielding "1110" for unary encoding. The next greatest encoded value (5) is augmented per X-T, where T=4, hence a small Golomb entry (552) of "001," and prefixed with T set bits "1111" to form entry 508-5 as "1111001." This alleviates any ambiguity on decoding, as three or fewer "1" bits implies unary encoding, and 4 "1" bits implies at least small Golomb encoding. The escape sequence of "1111" for small Golomb changes to the escape pattern of "1111000" for large Golomb by adding the Golomb (0, M0) value, as shown at entry 401-3. The shift from small Golomb to large Golomb occurs at entry 508-40, where the decoder will find the large Golomb escape pattern. The boundaries for transitions between encoding methods depend on the encoding parameters selected.

Figure 6:
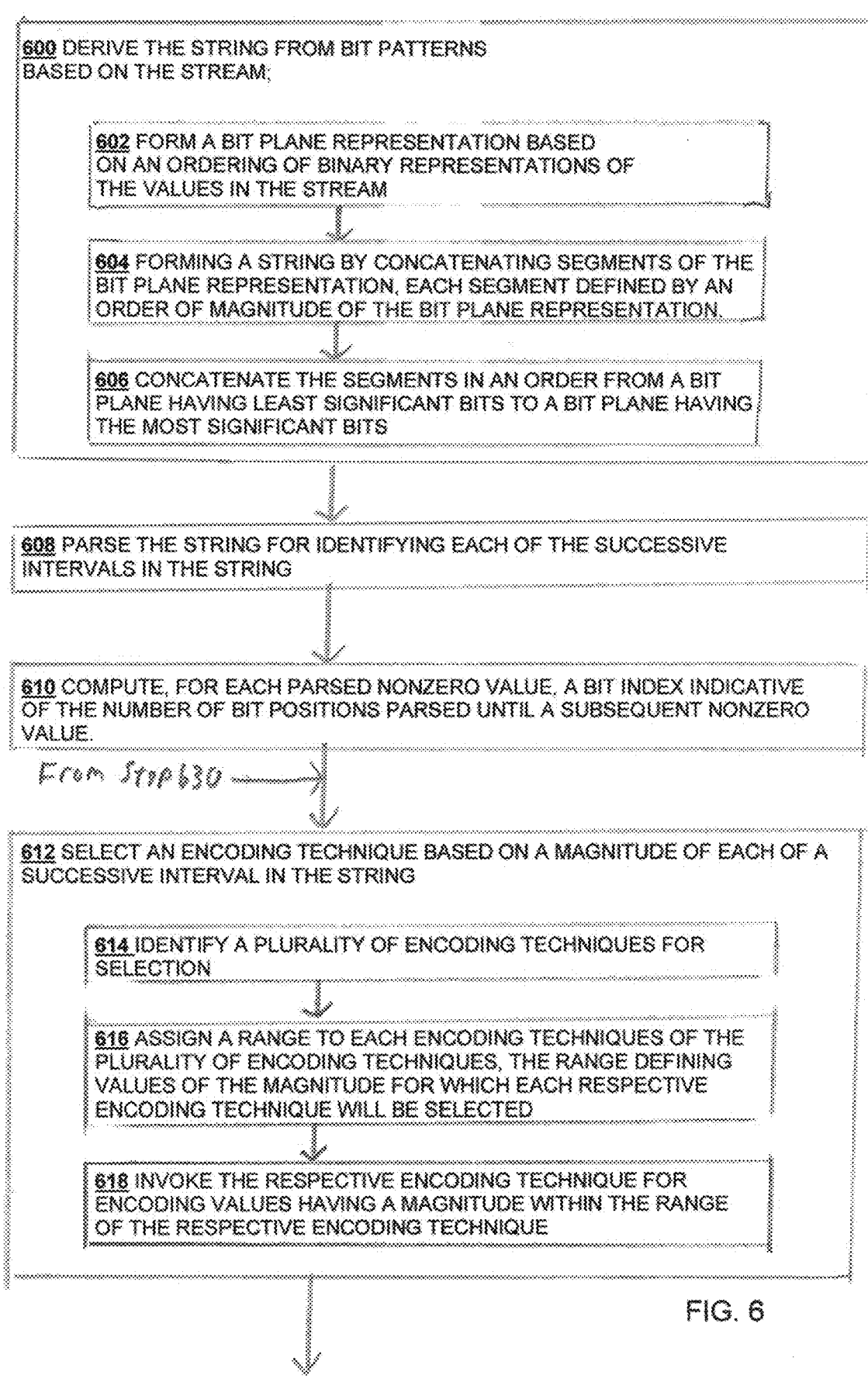
FIG. 6 is a flowchart of encoding according to FIGS. 3-5.
Figure 6:
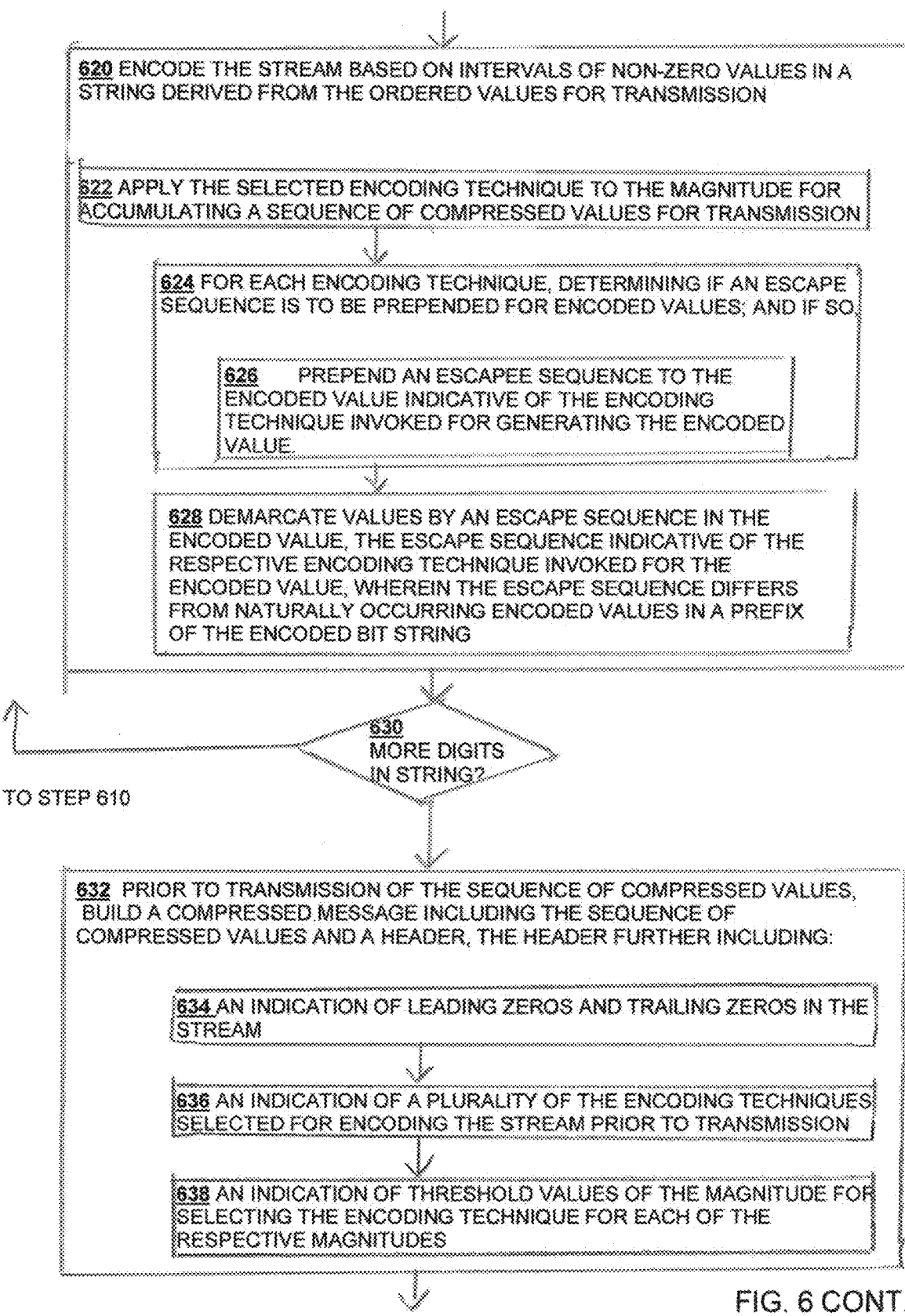
Figure 6:
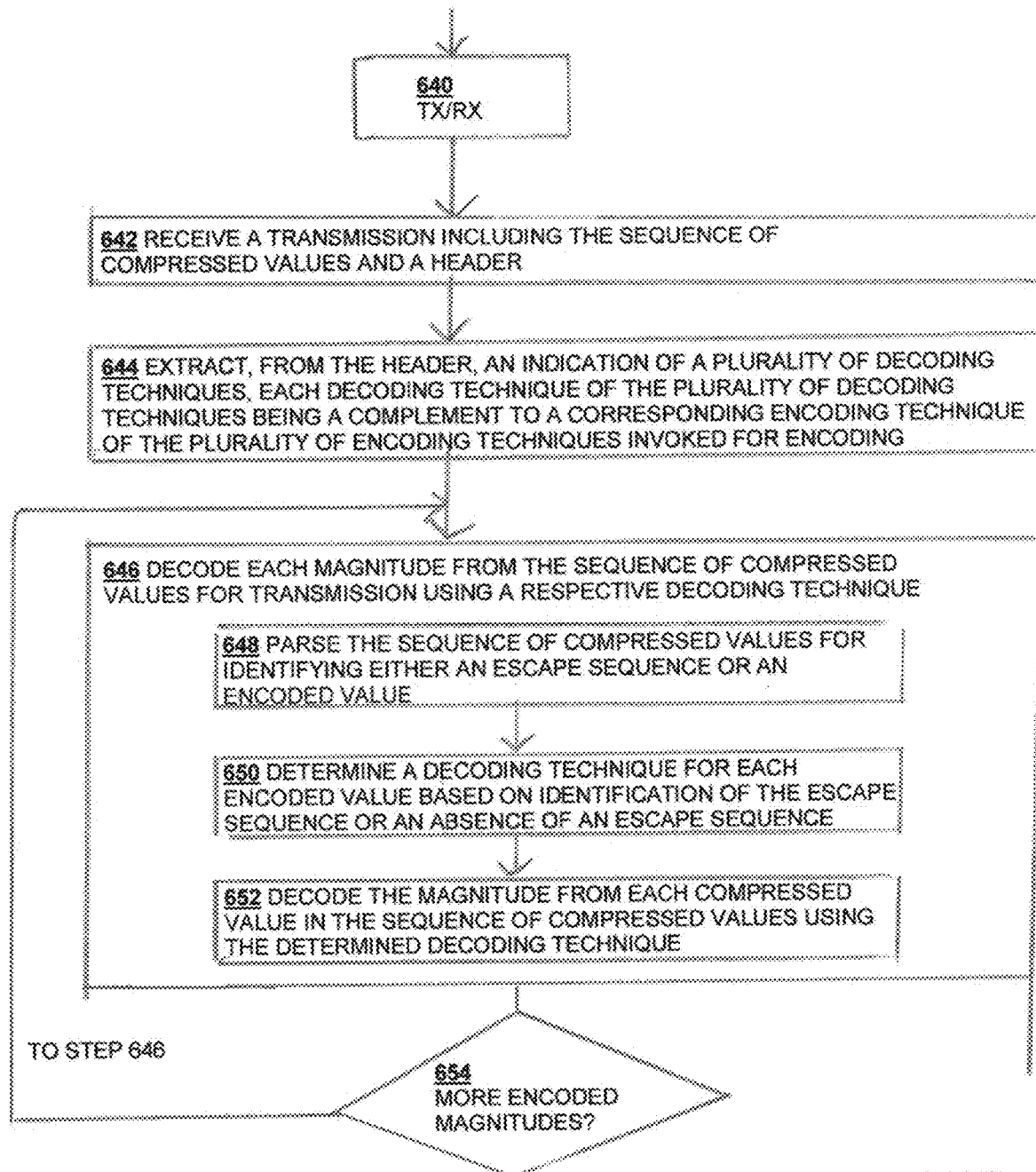

FIG. 6 is a flowchart of encoding according to FIGS. 3-5. Referring to FIG. 6, and continuing to refer to FIGS. 3-5, at in a stream 310 of integer values based on incremental bins of gathered data, a method for stateless, lossless encoding of ordered values for transmission includes, at step 600, deriving the string 330 from bit patterns based on the stream 310. This includes forming a bit plane representation 320 based on an ordering of binary representations of the values in the stream 310, as depicted at step 602. From the bit plane 320, the encoding app 114 forms the string 330 by concatenating segments 335 of the bit plane representation, such that each segment is defined by an order of magnitude of the bit plane representation, as shown at step 604. For a binary representation, the orders of magnitude run from LSB 321 to MSB 322. The encoding app 114 concatenates the segments 335 in order from the bit plane 320 having least significant bits to a bit plane having the most significant bits, as depicted at step 606. The string 330 now includes a linear array defining a serialized bit plane representation 332 of the stream 310 of integers.

The encoding app 114 parses the string 330 for identifying each of the successive bit index differences, henceforth referred to as intervals, 345 in the string, as disclosed at step 608. Since the string 330 includes only digits 1 and 0, intervals 345 can be identified as a run of 0 values between each 1 value, expressed as a bit index difference. Hence, a 1 immediately following a one has a bit index of 1 position, a run of 2 zeroes defines the successive 1 value at 3 bit index positions away, and so forth. The result is the sequence of bit index differences 242 along the string.

The encoding app 114 computes, for each parsed nonzero value, a bit index difference 340 indicative of the number of bit positions parsed until a subsequent nonzero value, as depicted at step 610. For each bit index difference, the encoding app selects an encoding technique based on a magnitude 355 of each of a successive interval 345 in the string, as shown at step 612. The encoding app 114 identifies a plurality of encoding techniques for selection, such as in table 400, as disclosed at step 614. This is generally fixed for a particular configuration based on the selected encoding parameters (3 tiers as shown), but could be tuned or augmented over time.

Selection of the encoding technique is preceded by, as discussed above, assigning a range 408 to each encoding technique 404 of the plurality of encoding techniques, such that the range defines values of the magnitude for which each respective encoding technique will be selected, as depicted at step 616. The respective encoding technique is then invoked for encoding values having a magnitude within the range of the respective encoding technique, as disclosed at step 618. Generally, the encoding logic for magnitude-based selection is instantiated in the software and need not change.

The full encoded sequence 350 is accumulated by encoding the stream based on intervals of non-zero values in the string 330, and derived from the ordered values for transmission, as depicted at step 620. This includes applying the selected encoding technique to the magnitude for accumulating a sequence of compressed values for transmission, as depicted at step 622, and for each encoding technique, determining if an escape sequence is to be prepended for encoded values, as shown in table 400 (step 624).

If an escape sequence ("1111" or "1111000" in the example shown) is called for, the encoding app 114 prepends an escape sequence to the encoded value indicative of the encoding technique invoked for generating the encoded value, depicted at step 626. This is to demarcate values by an escape sequence in the encoded value, where the escape is sequence indicative of the respective encoding technique invoked for the encoded value and differs from naturally occurring encoded values in a prefix of the encoded bit string, as shown at step 628. In the example above, unary encoding is only employed for values up to 1110, or 3 consecutive "1" values. Similarly, the large Golomb escape sequence precludes all small Golomb values—if the four is are followed by 3 0s, the magnitude was encoded using large Golomb encoding and should be decoded similarly.

A check is performed, at step 630, to identify if there are more digits in the list of bit index differences 340 for encoding. If not, then prior to transmission of the sequence of compressed values, the encoding app 114 builds a compressed message 150 including the sequence of compressed values and a header, as depicted at step 632.

The compressed header 360 includes the following 7 quantities: total number of channels/bins, the unary threshold T, M0, M1, the number of zeros removed from the front and back of the spectrum, and the first occupied bit index position. The header 360 is followed by the sequence of encoded bit index differences 350 and an end of compressed bytes pattern if desired. During decompression, the parameters in the header are read in and the three decoding parameters (T, M0, M1) are then used to decode the remainder of the compressed magnitudes.

Accordingly, the encoding app 114 writes an indication of leading zeros and trailing zeros in the stream, as depicted at step 634, and an indication of a plurality of the encoding techniques selected for encoding the stream prior to transmission, as shown at step 636. Also included are the encoding parameters necessary for selecting the encoding technique for each of the respective magnitudes, as shown at step 638.

Referring again to FIG. 1, the header 360 and encoded sequence 350 are transmitted in a message 130 to be decoded by a complementary decoding app 124 at the monitoring facility 120 responsible for decoding and correlating the magnitude 335 values.

Accordingly, the monitoring facility 120 receives a transmission 130 including the sequence of compressed values 350 and the header 360, as depicted at step 642. The decoder extracts, from the header, an indication of a plurality of decoding techniques. This includes the unary threshold and M0, M1 Golomb parameters such that each decoding technique of the plurality of decoding techniques is a complement to a corresponding encoding technique of the plurality of encoding techniques invoked for encoding, as depicted at step 644. In contrast to conventional approaches, all information needed to decode is included in the header such that the transmission 130 is stateless and not dependent on any other transmissions. In contrast, conventional stateful approaches require the aggregation of information from consecutive transmissions such that one depends on another.

At step 646, the decoding app 124 decodes each magnitude from the sequence of compressed values for transmission using a respective decoding technique. In general, this is the complement or inverse to the encoding, and includes parsing the sequence of compressed values 350 for identifying either an escape sequence or an encoded value, as shown at step 648. The decoder determines a decoding technique for each encoded value based on identification of the escape sequence or an absence of an escape sequence, as depicted at step 650. This would mean parsing the escape sequence (or non-existence, as for unary values) and based on the deterministic sequence, identifying the encoding technique used so that the complementary decoding technique may be invoked. The decoding app 124 decodes the magnitude from each compressed value in the sequence of compressed values using the determined decoding technique, as depicted at step 652, and at step 654 a check is performed for additional encoded magnitudes. Control reverts to step 646 to parse each magnitude from the sequence 350. It should be apparent that the decoding occurs iteratively as data is received, and that the stateless operation needs only the encoding thresholds and parameters (unary, M0 and M1), obtained from the header, in order to complete the decoding. In other words, each transmission is decoded using only its header, and need not rely on a context or receipt of prior or successively sent transmission 130.

Figure 7:
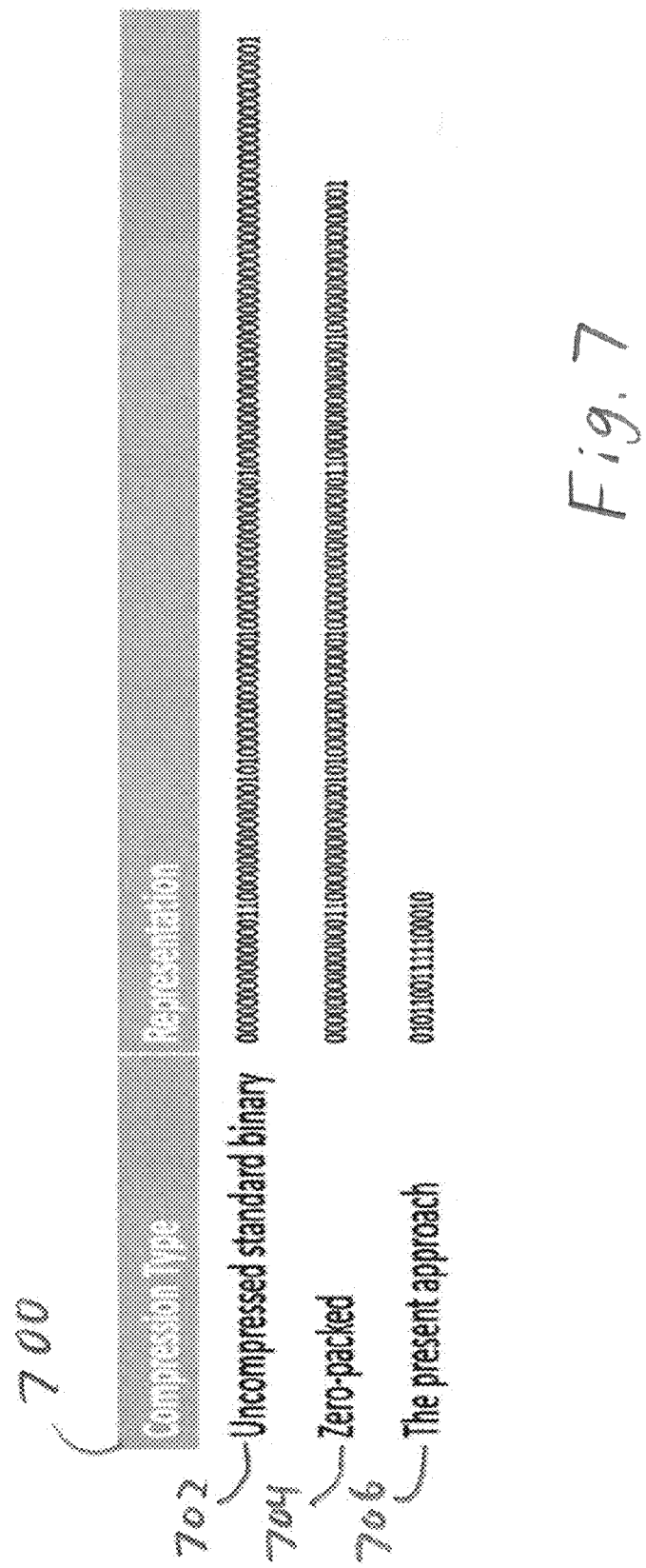
FIG. 7 shows a comparison of encoding results including the encoding approach of FIGS. 2-6.

FIG. 7 shows a comparison of encoding results including the encoding approach of FIGS. 2-6. FIG. 7 includes results 700 for zero packed encoding 704 and the present approach 706 disclosed above based on an uncompressed binary string 702.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a stream of integer values based on incremental bins of gathered data, a method for stateless, lossless encoding of ordered values for transmission in the stream, comprising:
   computing a binary sequence of the stream based on a binary representation and on a maximum value of the ordered values for transmission;
   encoding the stream from the binary sequence based on intervals of non-zero values in a string derived from the ordered values for transmission;
   selecting an encoding technique based on a magnitude of each of a successive interval in the string; and applying the selected encoding technique to the magnitude for accumulating a sequence of compressed values for transmission.

2. The method of claim 1 further comprising:
deriving the string from bit patterns based on the stream;
parsing the string for identifying each of the successive intervals in the string; and
computing, for each parsed nonzero value, a bit index difference indicative of the number of bit positions parsed until a subsequent nonzero value.

3. The method of claim 1 further comprising:
forming a bit plane representation based on an ordering of binary representations of the values in the stream;
forming a string by concatenating segments of the bit plane representation, each segment defined by an order of magnitude of the bit plane representation.

4. The method of claim 3 further comprising concatenating the segments in an order from a bit plane having least significant bits to a bit plane having the most significant bits.

5. The method of claim 3 wherein each segment has a number of bits based on the number of values between a first nonzero value in the stream and a last nonzero value in the string.

6. The method of claim 3 wherein the bit plane representation includes an array of binary digits having dimensions based on a run of nonzero values in the stream and a number of binary bits representing a largest value in the stream.

7. The method of claim 1 further comprising:
identifying a plurality of encoding techniques for selection;
assigning a range to each encoding techniques of the plurality of encoding techniques, the range defining values of the magnitude for which each respective encoding technique will be selected; and
invoking the respective encoding technique for encoding values having a magnitude within the range of the respective encoding technique.

8. The method of claim 7 further comprising:
for each encoding technique, determining if an escape sequence is to be prepended for encoded values; and if so,
prepending an escape sequence to the encoded value indicative of the encoding technique invoked for generating the encoded value.

9. The method of claim 8 further comprising:
receiving a transmission including the sequence of compressed values and a header;
parsing the sequence of compressed values for identifying either an escape sequence or an encoded value;
determining a decoding technique for each encoded value based on identification of the escape sequence or an absence of an escape sequence; and
decoding the magnitude from each compressed value in the sequence of compressed values using the determined decoding technique.

10. The method of claim 7 further comprising demarcating values by an escape sequence in the encoded value, the escape sequence indicative of the respective encoding technique invoked for the encoded value, wherein the escape sequence differs from naturally occurring encoded values in a prefix of the encoded bit string.

11. The method of claim 10 wherein the plurality of encoding techniques includes Golomb encoding, further comprising selecting a Golomb parameter for each Golomb based encoding technique, further comprising:
prior to encoding, augmenting each magnitude with an offset for shifting the encoding to a lower value, the offset based on the selected encoding technique and the corresponding escape sequence.

12. The method of claim 1 further comprising, prior to transmission of the sequence of compressed values,
building a compressed message including the sequence of compressed values and a header, the header further including:
an indication of leading zeros and trailing zeros in the stream;
an indication of a plurality of the encoding techniques selected for encoding the stream prior to transmission; and
an indication of threshold values of the magnitude for selecting the encoding technique for each of the respective magnitudes.

13. The method of claim 1 further comprising:
receiving a transmission including the sequence of compressed values and a header;
extracting, from the header, an indication of a plurality of decoding techniques, each decoding technique of the plurality of decoding techniques being a complement to a corresponding encoding technique of the plurality of encoding techniques invoked for encoding; and
decoding each magnitude from the sequence of compressed values for transmission using a respective decoding technique.

14. The method of claim 1, further comprising selecting the encoding sequence for nonzero values in the string from a plurality of encoding techniques.

15. A network device for encoding a stream of integer values based on incremental bins of gathered data defined by ordered values for transmission, comprising:
a processor for computing a binary sequence of the stream based on a binary representation and on a maximum value of the ordered values for transmission;
an encoder and a memory responsive to the processor for encoding the stream based on intervals of non-zero values in a string derived from the ordered values for transmission;
encoding logic in the memory for selecting an encoding technique based on a magnitude of each of a successive interval in the string; and
a data structure stored in the memory for applying the selected encoding technique to the magnitude for accumulating a sequence of compressed values for transmission.

16. The device of claim 15 further comprising
a string for storing bit patterns based on the stream,
the encoding logic configured for parsing the string to identify each of the successive intervals in the string, and
a bit index sequence for computing, for each parsed nonzero value, a bit index difference indicative of the number of bit positions parsed until a subsequent nonzero value.

17. The device of claim 15 further comprising:
a bit plane representation based on an ordering of binary representations of the values in the stream;
the encoding logic configured to form a string by concatenating segments of the bit plane representation, each segment defined by an order of magnitude of the bit plane representation.

18. The device of claim 17 wherein each segment has a number of bits based on the number of values between a first nonzero value in the stream and a last nonzero value in the string.

19. The device of claim 17 wherein the bit plane representation includes an array of binary digits having dimensions based on a run of nonzero values in the stream and a number of binary bits representing a largest value in the stream.

20. A computer program embodying program code on a non-transitory medium that, when executed by a processor, performs steps for implementing a method of lossless, stateless encoding of data for transmission in a stream of ordered values, the method comprising:

computing a binary sequence of the stream based on a binary representation and on a maximum value of the ordered values for transmission;

parsing a string based on a bit plane of the least significant bits of a stream of ordered values for transmission;

encoding the string based on intervals of non-zero values in the string, each interval defining a bit index difference indicative of a position of a next non-zero bit;

for each interval, selecting an encoding technique from a plurality of encoding techniques based on a magnitude of the respective bit index difference, each encoding technique applicable to a range of values of bit indices; and accumulating a sequence of compressed values for transmission based on applying the selected encoding technique to each successive bit index difference to generate a compressed value.

\* \* \* \* \*